UNITED STATES PATENT OFFICE.

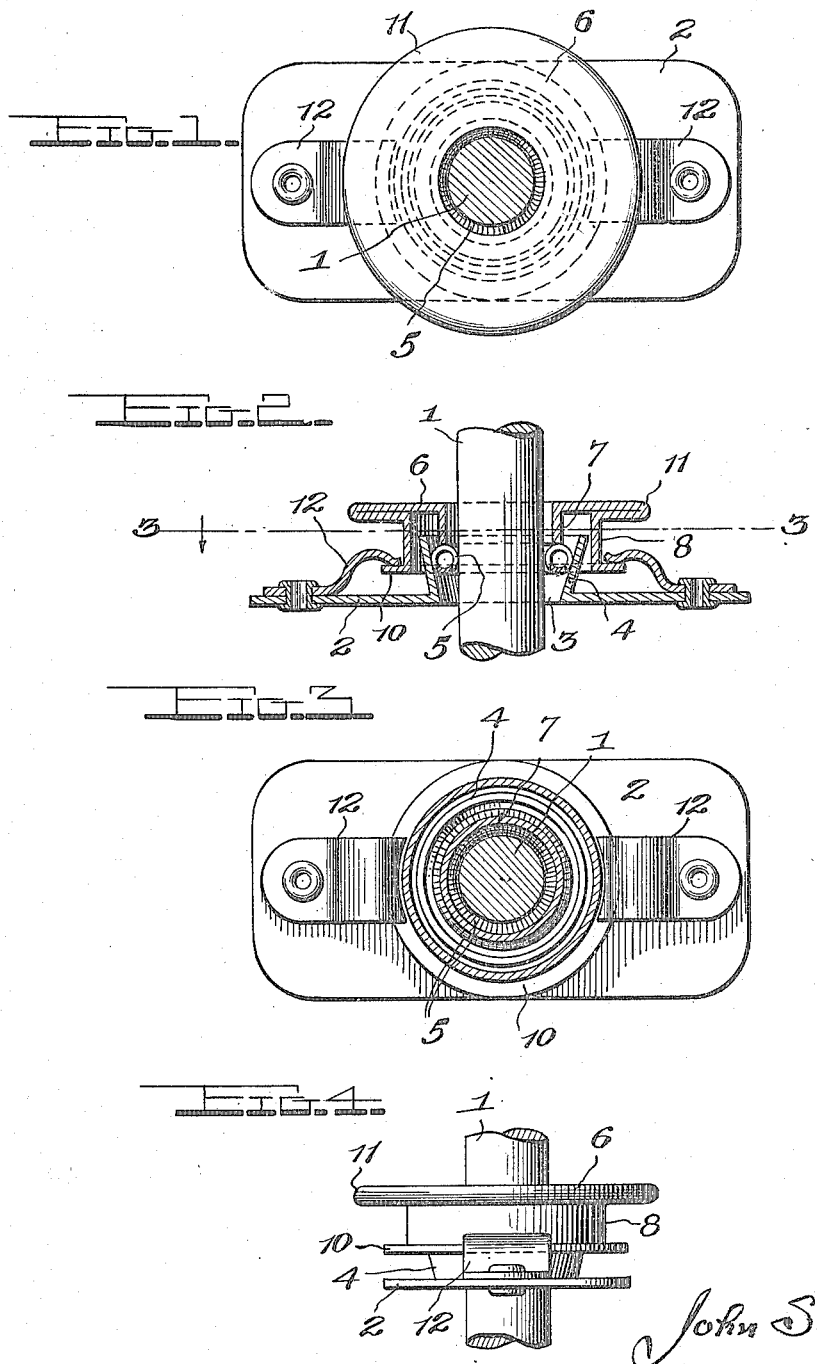

JOHN SCHADE, OF HOLYOKE, MASSACHUSETTS, ASSIGNOR TO NATIONAL BLANK BOOK CO., OF HOLYOKE, MASSACHUSETTS, A VOLUNTARY TRUST ASSOCIATION OF COPARTNERSHIP HAVING AS TRUSTEES J. W. TOWNE, F. B. TOWNE, E. S. TOWNE, J. M. TOWNE, AND F. W. WILSON.

FRICTION-CLUTCH DEVICE FOR TELESCOPING ELEMENTS.

1,270,977.    Specification of Letters Patent.    Patented July 2, 1918.

Original application filed December 26, 1916, Serial No. 138,846. Divided and this application filed July 31, 1917. Serial No. 183,790.

*To all whom it may concern:*

Be it known that I, JOHN SCHADE, a citizen of the United States, residing at Holyoke, in the county of Hampden, State of Massachusetts, have invented certain new and useful Improvements in Friction-Clutch Devices for Telescoping Elements; and I do declare the following to be a full, clear, and exact description of the invention, such as will enable others skilled in the art to which it appertains to make and use the same.

This invention relates to certain new and useful improvements in a friction clutch device for telescoping elements, the same being a division of my pending application filed Dec. 26, 1916, Serial No. 138,846, and it has for one of its principal objects to provide a clutch part carried by the female part and adapted to be contracted about the male part for securely gripping the latter.

Further, the invention resides in a sheet metal construction which embodies a base plate having a flared shell within which a contractible coiled clutch ring is arranged for being moved into the smaller end thereof to contract it against the male element passed through the shell.

The invention further resides in the features of construction hereinafter described and claimed, reference being had thereto in the accompanying drawing wherein:

Figure 1 is a top plan view of the clutch device as constructed in accordance with the present invention;

Fig. 2 is a vertical section thereof;

Fig. 3 is a horizontal section on line 3—3 of Fig. 2; and

Fig. 4 is a side elevation of the friction clutch device.

Referring more in detail to the drawing, the numeral 1 designates the male member and 2 the female member, the latter comprising a base plate formed with a central opening 3 and an integral and annular shell or wall 4 that flares upwardly from the edge of the opening.

An expansible and contractible clutch 5 is disposed within the tapering shell 4 and comprises a coiled spring wound open so that when the ends of the spring are secured together to form a ring, the normal tendency of the coiled ring will be to expand and move upwardly into the larger or wider end of the shell. Consequently, if the clutch ring is moved downwardly in the tapering shell from its normal position in the larger end thereof, said clutch will be contracted about the male member for securely and frictionally holding the same.

A follower 6 is provided for moving the clutch to operative position and embodies a top wall having inner and outer concentric walls 7 and 8 that receive the upper edge of the shell therebetween. The inner wall 7 rests on the clutch ring and serves to move the same down into the smaller end of the shell. The outer wall 8 is formed on its lower edge with a peripheral flange 10 and is supported at its upper edge by a peripheral flange that underlies in contact therewith the outer edge portion of the top wall to which it is integrally secured for providing a lift or hold 11.

The follower is yieldably urged downward on the clutch ring by a pair of leaf springs 12 that are fixedly secured on opposite sides of the follower to the base plate and which have their free terminals bowed upwardly for bearing on the flange 10.

In operation, the male member is passed upwardly through the shell and the coinciding plate opening without interference by the clutch ring since the action on the latter is to further expand it. However, any attempt to withdraw the rod 1 will be checked by the clutch ring which is resiliently urged into frictional contact with the rod by the follower. Therefore, the greater the pull on the rod the tighter the clutch grips the same. To remove the rod or male member, the follower is lifted by engaging the fingers beneath the hold 11 and pulling up. This releases the clutch from pressure and permits the same to expand upwardly away from the rod.

A very efficient clamping action is thus afforded, the device being simple and economical in construction. Preferably the several parts are formed from sheet metal, their forming operation being readily performed by a stamping process.

The invention is especially adapted for top lock or ledger leaf binders, desk spikes, curtain rods and other devices in which one element telescopes another.

What is claimed is:

1. In a friction clutch, a male member and a female member, the latter comprising a base plate formed with an opening to receive the male member and provided with a flared annular shell integral with the edge of the plate opening, a coiled spring wound open and having its ends secured together to form a contractible clutch ring, said ring normally disposed in the larger end of the shell for movement into the smaller end thereof for contraction about the male member, a follower comprising a top wall having spaced depending walls receiving the larger end of the shell therebetween, said depending walls being concentrically related with the inner one resting on the clutch ring, and means yieldably urging the follower toward the shell.

2. In a friction clutch, a male member and a female member, the latter comprising a base plate formed with an opening to receive the male member and provided with a flared annular shell integral with the edge of the plate opening, a coiled spring wound open and having its ends secured together to form a contractible clutch ring, said ring normally disposed in the larger end of the shell for movement into the smaller end thereof for contraction about the male member, a follower comprising a top wall having spaced depending walls receiving the larger end of the shell therebetween, said depending walls being concentrically related with the inner one resting on the clutch ring, the outer depending wall having a peripheral flange on its free edge, and spring means engaging the flange for urging the clutch ring to operative position.

3. In a friction clutch, a male member and a female member, the latter comprising a base plate formed with an opening to receive the male member and provided with a flared annular shell integral with the edge of the plate opening, a coiled spring wound open and having its ends secured together to form a contractible clutch ring, said ring normally disposed in the larger end of the shell for movement into the smaller end thereof for contraction about the male member, a follower comprising a top wall having spaced depending walls receiving the larger end of the shell therebetween, said depending walls being concentrically related with the inner one resting on the clutch ring, the outer depending wall having a peripheral flange on its free edge, and a pair of leaf springs secured to the base plate on opposite sides of the follower and having their free ends bearing on the flange.

4. In a friction clutch, a male member and a female member, the latter comprising a base plate formed with an opening to receive the male member and provided with a flared annular shell integral with the edge of the plate opening, a coiled spring wound open and having its ends secured together to form a contractible clutch ring, said ring normally disposed in the larger end of the shell for movement into the smaller end thereof for contraction about the male member, a follower comprising a top wall having spaced depending walls receiving the larger end of the shell therebetween, said depending walls being concentrically related with the inner one resting on the clutch ring, means yieldably urging the follower toward the shell, and a peripheral flange overhanging the outer wall for providing a lift for removing the pressure of the follower from the clutch ring.

In testimony whereof I affix my signature.

JOHN SCHADE.

Witnesses:
WALTER H. O'BRIEN,
BERTHA L. ALLYN.

Copies of this patent may be obtained for five cents each, by addressing the "Commissioner of Patents, Washington, D. C."